DON CARLOS TRAVIS.
SPRING SEAT.
APPLICATION FILED DEC. 26, 1911.

1,051,466.

Patented Jan. 28, 1913.

2 SHEETS—SHEET 1.

DON CARLOS TRAVIS.
SPRING SEAT.
APPLICATION FILED DEC. 26, 1911.
1,051,466.
Patented Jan. 28, 1913.
2 SHEETS—SHEET 2.
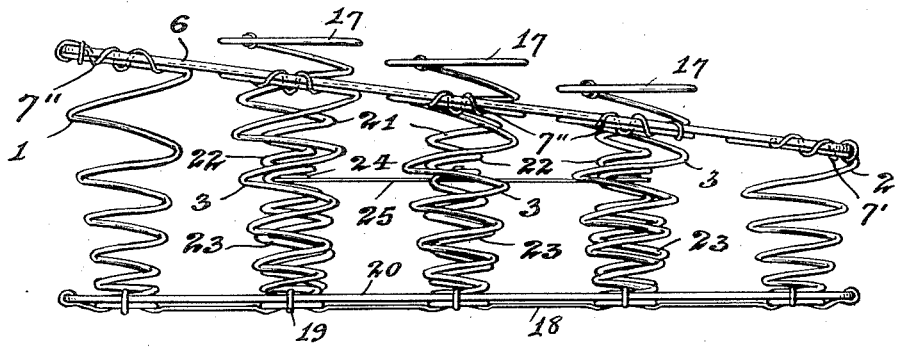
Fig. 2.
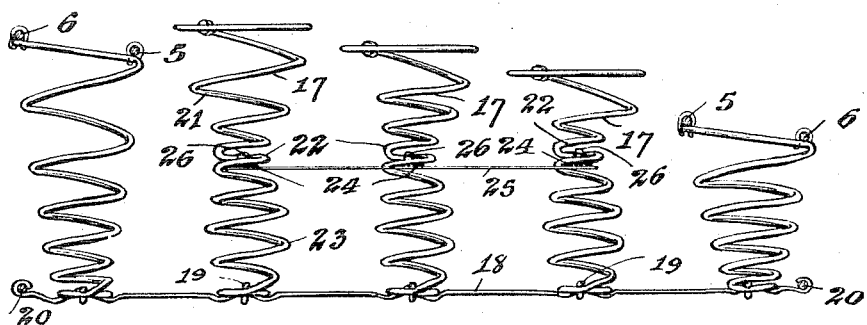
Fig. 3.
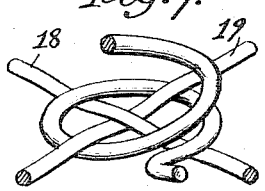
Fig. 7.
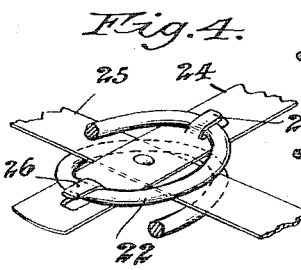
Fig. 4.
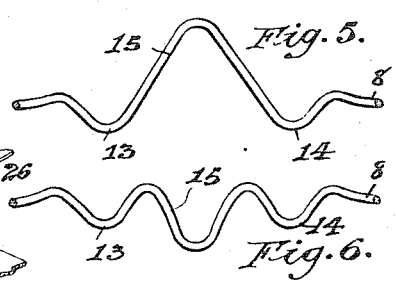
Fig. 5.
Fig. 6.
Witnesses,
Inventor,
Don Carlos Travis
By Offield, Towle, Graves, & Offield
Attys.

UNITED STATES PATENT OFFICE.

DON CARLOS TRAVIS, OF KENOSHA, WISCONSIN, ASSIGNOR TO THE SIMMONS MANUFACTURING COMPANY, OF KENOSHA, WISCONSIN, A CORPORATION OF WISCONSIN.

SPRING-SEAT.

1,051,466.   Specification of Letters Patent.   Patented Jan. 28, 1913.

Application filed December 26, 1911. Serial No. 667,690.

*To all whom it may concern:*

Be it known that I, DON CARLOS TRAVIS, a citizen of the United States, residing in the city of Kenosha, county of Kenosha, and State of Wisconsin, have invented a certain new and useful Improvement in Spring-Seats, of which the following is a specification.

This invention relates to improvements in spring seats, and refers more particularly to a seat for use with motor cars, automobiles and the like, and is generally formed by a series of coiled or helical springs.

Among the salient objects of the invention are to provide a construction having relatively stiff outer springs forming a border extending entirely around the seat and inclosing a more resilient inner spring cushion, whereby the shape of the seat is always maintained and, at the same time, sufficient resiliency is secured; to provide a construction of the above character in which the springs forming the entire cushion are so formed that they will support a relatively heavy load and, at the same time, maintain sufficient resiliency for a light or normal load; to provide a construction in which the springs forming the inner cushion are disconnected from the relatively stiff border springs and operate independently of the latter; to provide a construction in which the inner springs are so connected that they will at all times maintain their normal alinement, while, at the same time, having their upper halves independently movable; to provide a construction of the character referred to, novel means for securing the outer or rim springs to the border wires; to provide a construction which maintains the desired resiliency whether riding over smooth or rough roads and which, at the same time, will withstand severe strains without injuring the spring members, and, in general, to provide a simple and economical construction of the character referred to.

The invention consists in the matters hereinafter described and more particularly pointed out in the appended claims.

In the drawings, Figure 1 is a top plan view; Fig. 2 is a side elevation; Fig. 3 is a transverse sectional view; Fig. 4 is a fragmentary detail showing the manner of securing the cross slats to the inner springs; Fig. 5 is a detail showing one of the integrally formed clips before bending; Fig. 6 is a similar view showing the clip after being bent over its border wire; and Fig. 7 is a detail view showing the manner of securing the lower ends of the springs to the base wires.

Referring to the drawings, 1 designates the outer front row of border springs, 2 the back row, and 3 and 4 the side rows. To the upper end of each of these rows is secured an inner border wire 5 and an outer border wire 6. Each of these border wires, as is shown more clearly in Fig. 1, extends entirely around the rim of the seat, and is preferably formed as an endless wire. The border springs and connecting wires inclose the springs 17 forming the inner cushion hereinafter more particularly described.

As a feature of the invention, the upper ends of the outer springs are secured to the border wires by a series of integrally formed clips which not only effectively tie the springs to the border wires, but provide a ready means for accurately centering the outer springs. These integrally formed clips also serve to add additional strength to the rim portion of the seat. Describing more in detail the manner of securing the springs to the border wire, the springs of the front row 1 are secured at their upper outer edge to the border wire 6 by means of clips 7, which are integrally formed with the wire 8 extending across the front edge of the seat. Each of these clips comprises upper bends 13 and 14 and a central bend or tongue 15. In securing the clips to the springs and border wires, the bends 13 and 14 extend under the top coil of the springs and the border wire and the tongue is then bent inwardly and downwardly as shown in Fig. 1. The members of each row of clips are spaced equidistant apart, and accordingly when the clips are connected to the springs and border wires, the former will necessarily be accurately centered. The connecting wire for each row of clips forms, in effect, an additional border wire which adds to the strength and rigidity of the outer row of springs.

The rear edge of the front row of springs 1 is secured to the border wire 5 by identically formed clips 9 integral with the connecting wire 10. It will be noted that the corner springs 1ª are, in the present instance, not connected at their inner edge to the border wire 5. The rear row of springs

2 is fastened to the border wires in exactly the same way as the front row, by means of clips 7' and 9' integrally secured to the connecting wires 8' and 10' respectively. It will also be noted that the connecting wire 8' extends the entire length of the rear row of springs 2, and the corner springs 2ª of the latter are connected to the outer border wire 6 by clips 7'. The end springs 3 and 4 are similarly connected to the border wires 5 and 6 by clips 7'' and 9'', integrally formed with the connecting wires 8'' and 10''. The front corner springs 1ª are preferably connected to the sides of the outer border wire 6 by means of the clips 7''.

While the outer springs are relatively strong, their rigidity is materially increased not only by the border wires, but by the wires connecting the clips as heretofore stated. At the same time, the border springs have sufficient resiliency to be comfortable for the user.

The lower ends of the border springs are secured to transversely extending wires 18 and longitudinally extending wires 19, the ends of the wires 18 and 19 being secured to the base border wire 20, which extends entirely around the bottom of the seat and is preferably formed as an endless wire, as shown. The transverse wires 18 and the longitudinal wires 19 are looped through the lower coils of the springs in the manner shown in Fig. 7, which construction, however, forms no part of the present invention.

Referring now to the manner of forming the inner springs 17, which comprises upper coils 21, central coils 22 and bottom coils 23. The upper coils 21 are comparatively resilient, while the central coils 22 are relatively stiff. Preferably, the lower coils 23 are of a resiliency intermediate the upper and central coils 21 and 22. The lower ends of these inner springs 17 are secured to the transverse wires 18 and 19 in the manner shown in Fig. 7. These inner springs 17 are centered by means of longitudinally extending straps or slats 24 and transverse or cross slats 25. The slats 24 are provided with a plurality of pairs of tongues 26, which are struck up from the strap and looped over one of the central coils 22, as is shown more clearly in Fig. 4. These slats or straps not only effectively center the inner springs, but add to the rigidity and strength of the central coils 22 of the spring. The upper coils 21 are free as shown, and accordingly more resilient than if connected. It will be noted that the inner springs 17 are entirely disconnected from the border springs, so that the inner cushion can move independently of the rim of the seat, and the upper half of each inner spring moves independently of the upper half of the remaining inner springs.

The construction and arrangement of the inner springs is such that a normal weight on the springs is supported by the upper coils 21 of the inner springs, it being noted that the inner springs, in the present instance, project above the plane of the border springs. When the car strikes a rut or obstruction in the road so as to depress the upper coils 21, the shock and weight are borne by the relatively stiff central coils 22. These central coils are, of course, riding resiliently on the lower coils 23, and accordingly the passenger will experience no discomfort or shock when the car passes over said rut or obstruction in the road. In the case of an excessive weight or shock, the lowermost coils 23 will, of course be depressed.

It is to be understood that while the border springs are relatively much stiffer than the inner cushion as a whole, they are nevertheless sufficiently resilient to permit the seat to ride easily.

The invention is not limited to the details of construction shown, except as set forth in the appended claims.

I claim as my invention:

1. In a spring seat, the combination with a plurality of rows of inner coiled springs, each of said inner springs comprising relatively resilient upper coils, relatively stiff central coils, and lower coils of a resiliency intermediate the upper and central coils, a plurality of longitudinally and transversely extending slats connected to the central coils of said inner springs, a row of coiled border springs inclosing said inner springs and of less resiliency than the upper coils of the inner springs, a pair of border wires inclosing the upper ends of said outer springs, clips connecting the border wires to the upper ends of said outer springs, the clips for each side of each border wire being integrally connected, and means for connecting the lower ends of said outer and inner springs.

2. In a spring seat, the combination with a plurality of rows of inner coiled springs, each of said inner springs comprising relatively resilient upper coils, relatively stiff central coils, and lower coils of a resiliency intermediate the upper and central coils, a plurality of longitudinally and transversely extending slats connected to the central coils of said inner springs, a row of coiled border springs inclosing said inner springs and of less resiliency than the upper coils of the inner springs, a pair of border wires inclosing the upper ends of said outer springs, means for securing said border wires to the upper ends of said outer springs, and means for connecting the lower ends of the inner and outer springs, said inner and outer springs moving independently of each other.

3. In a spring seat, the combination with a plurality of rows of springs forming an inner cushion, each of said inner springs having a relatively resilient upper end and a stiffer lower portion, means for connecting said inner springs intermediate their ends whereby each of said inner springs has its upper portion independently movable of the upper portions of the remaining inner springs, a row of outer springs having less resiliency than the upper portion of said inner springs, means for connecting the upper ends of the outer springs, and means for connecting the lower ends of the inner and outer springs, said inner and outer springs moving independently of each other.

4. In a spring seat, the combination with a plurality of coiled springs forming an inner cushion, of a row of outer coiled springs inclosing said inner springs and of less resiliency than said inner springs to form a relatively stiff border, means for connecting the upper ends of said border springs, means for connecting said inner springs intermediate their ends, and means for connecting the lower ends of said inner and outer springs.

5. In a spring seat, the combination with a plurality of inner coiled springs, each of said inner springs having coils of varying resiliency, a plurality of outer coiled springs inclosing said inner springs, a pair of border wires extending around the rim of the seat, integrally formed clips securing each side of the respective border wires to the upper ends of the adjacent outer springs, and means for connecting the lower ends of said inner and outer springs, said inner and outer springs being arranged to move independently of each other.

6. In a spring seat, the combination with longitudinally and transversely extending rows of inner coiled springs, of a row of coiled border springs, a pair of border wires, a plurality of integrally formed clips for connecting each of said border wires to the upper ends of said border springs, and means for connecting the lower ends of said inner and border springs, said inner and border springs moving independently of each other.

7. In a spring seat, the combination with a plurality of inner coiled springs, of a plurality of coiled border springs, border wires at the upper ends of said border springs and lying along the opposite sides of the latter, tie-wires at the upper ends of said border springs and lying along side of the respective border wires, a plurality of clips formed integrally with the respective tie wires and connecting the border wires to the border springs, and means for connecting the lower ends of said inner and outer springs.

8. In a spring seat, the combination with a plurality of inner coiled springs, of a plurality of coiled border springs, border wires at the upper ends of said border springs and lying along the opposite sides of the latter, tie-wires at the upper ends of said border springs and lying along side of the respective border wires, a plurality of clips formed integrally with the respective tie wires and connecting the border wires to the border springs and means for preventing lateral displacement of the inner springs relative to the border springs.

DON CARLOS TRAVIS.

Witnesses:
 J. H. CANTWELL, Jr.,
 A. D. CAVANAGH.